Patented Dec. 27, 1949

2,492,212

UNITED STATES PATENT OFFICE 2,492,212

METHODS FOR SEALING EARTH FORMATIONS AND AN EARTH SEALING PLUG SUITABLE THEREFOR

Manvel C. Dailey, Elmhurst, Ill., assignor to United States Gypsum Company, Chicago, Ill., a corporation of Illinois No Drawing. Application January 25, 1945, Serial No. 574,637

25 Claims. (Cl. 166—22)

The present invention relates to methods for sealing permeable earth formations, particularly those encountered in well-drilling operations, and during the bringing in and operation of oil wells.

It has already been proposed to employ various types of cements for the sealing of permeable earth formations, as well as for sealing the casings thereof. Among these, calcium sulfate has found considerable favor, particularly when the same is used under conditions where the setting time of the material is so controlled that the material will set at about the time a slurry thereof will reach the permeable formation in the earth. When using such calcium sulfate cements, which usually are made from a suitable blend of some form of calcined gypsum (calcium sulfate hemihydrate), fairly satisfactory results are obtained. There is, however, one serious defect in such plugs, namely, the fact that they are subject to erosion by water, which is occasioned primarily by the fact that gypsum (which is the form eventually assumed by the material upon setting) is slightly soluble in water. If a large amount of water in motion is in contact with the gypsum plug, and this water can find an outlet at some other point, even if it no longer erupts into the well, such water will eventually dissolve enough of the gypsum to effect a new breakthrough.

In accordance with the present invention, however, such undesired dissolving away of the gypsum is effectively prevented by the conjoint use therewith of a water-resistant resinous material, such as a triazine-aldehyde condensation product.

Accordingly, such a material, as for example a melamine-formaldehyde condensation product, in the condition where it is still water-soluble, is mixed with some form of calcined gypsum to form a flowable, pumpable slurry, which latter is then introduced in the permeable earth formation and allowed to set up therein under such conditions that, preferably, a sheath of set water-insoluble resinous material will form around the general mass of set gypsum; which latter of course also contains set resinous material within its interstices.

It is therefore one of the objects of the present invention to seal permeable earth formations by forcing thereagainst and thereinto a slurry comprising an aqueous suspension of a mixture of a rapidly setting cementitious material and a curable condensation product, whereby some of the latter is forced out of admixture with the cementitious material and forced into the formation, said condensation product being cured within the formation and within the mixture to form a protective water-resistant sheath around the set cementitious material.

A further object of the invention is the production of a plug for preventing access of water, gas, or other fluid to a hole in the earth from the surrounding earth formations, which comprises a core of a set cementitious material and a surrounding sheath of a cured water-resistant synthetic composition of the general nature of a synthetic resin, as for example a triazine-aldehyde resin.

In oil wells, permeable formations are often encountered which permit influx of water into the well. Such water mixes with the oil, thereby reducing the productive capacity of the well, increasing costs by requiring more power for pumping to bring the fluid to the surface, and requiring the employment of expensive separation processes to remove the water from the oil.

In addition to the gypsum products already briefly mentioned, many materials and processes are in use for sealing permeable earth formations to exclude fluids, either liquid or gaseous, therefrom. For example, water or gas may be shut off from bottom formations by placing of cement plugs in the bottom of the hole. Squeeze cementing is employed for sealing permeable formations above oil sands by the use of plugs and by squeezing a cement slurry under high pressure tightly against the permeable formation. Portland cement, calcium sulfate cements and other types of hydraulic setting or swelling materials have been proposed for this purpose. Such products and processes are limited in their effectiveness and life. Water slurries of hydraulic cements will set in open holes to form solid plugs, but will not penetrate for any appreciable distance into the surrounding permeable formations. Consequently, channeling may develop around the set plug, again permitting entrance of water or other fluid into the well. In the case of Portland cement, solid and tight plugs are difficult to obtain, due to the contraction which occurs during the setting of the cement. Calcium sulfate cements expand during setting and their setting time is controllable. Tight plugs are, therefore, easier to obtain and are more positive than plugs of Portland cement. However, calcium sulfate cements, as above indicated, are slowly soluble in water and may not be permanent, particularly in locations where rate of water flow through the formation is appreciable.

Liquid resins or resin-forming liquids have been proposed for sealing off permeable formations. When so employed, the resin, in liquid, emulsified, or solution form, is introduced into the hole and forced back into the formation by use of pressure. Various devices are employed to effect the set or cure of the resin. With thermo-setting resins, such as phenol-formaldehyde, urea-formaldehyde, methylol-urea, furfural resins, etc., a combination of an acid catalyst, combined with temperatures in excess of 125° F. will eventually effect the desired cure. Other resins or similar substances may be set by chemical means, use of combination materials, etc.

The use of straight resin solutions or resin-forming liquids, however, is subject to the following disadvantages: high cost per pound; setting action not accurately controllable, and dependent largely upon formation temperature and conditions; most of them are usable only at low pH values, resulting in improper and uncontrollable set in limestone formations and rapid corrosive action in the metallic casings; and high shrink during cure, resulting in a production of loose plugs, which may later develop channeling. Moreover, heat-settable resins can only be employed in formations having a temperature in excess of about 125° F.

By the process of the present invention, however, a slurry comprising a blend of a hydraulically setting cement and a water-soluble or dispersible thermo-setting resin is placed in the well. Pressure is applied, which forces the water solution or suspension of the resin into the permeable formation which surrounds the well bore, leaving a plug of unset cement in the well, said plug containing sufficient water to complete the setting of the cementitious portions thereof. The plug itself, of course, also contains an appreciable amount of resin which, after it has become cured and insoluble, aids in strengthening the set cement and protecting the same from the erosive action of the water.

More specifically, and as a preferred exemplification of the invention the following examples are given.

Example I

A dry blend of 75 parts by weight of "alpha" gypsum (Patent No. 1,901,051), 25 parts by weight of a water-soluble powdered melamine-formaldehyde condensation product and 0.05 parts by weight of sodium citrate is added to 25 parts by weight of a 2% solution of ammonium chloride. The whole is mixed to a slurry having the consistency of a thin syrup. The slurry is lowered by bailer, or pumped through the casing or drill pipe, to the bottom of the well, or to a previously placed plug located at the desired point; if a formation above the well bottom is to be sealed off. The bailer is removed, or the casing or drill pipe raised, to clear the still liquid slurry. Pressure is then applied sufficient to overbalance the formation pressure and to force a portion of the resin solution from the slurry mix into the porous formation. The depth to which the resin solution penetrates is a function of the permeability of the formation and of the applied pressure. Pressures on the order of 25–150 pounds per square inch above the formation pressure are sufficient to effect a penetration of from 2 to 5 inches into a formation having a permeability of about 75–100 millidarcies, which is normally sufficient to effect a complete and permanent seal. The action of the applied pressure, in addition to forcing a concentrated solution of the resin into the surrounding formation, effects a compacting and densification of the slurry in the open well bore with resultant increase in strength and density of the final set plug. The composition as described above will set to form a hard dense impervious plug in about 60–90 minutes, due to hydration or setting of the alpha gypsum. Setting of the cement is followed by curing of the resin, which acts to further harden and strengthen the cement plug and completely to seal the permeable formation to whatever depth it has been penetrated by the resin solution. The time at which the resin will become cured is dependent upon the type of resin employed, type and amount of resin catalyst present, and the formation temperature. In the composition as given, the resin will become converted to a hard water- and-oil-insoluble solid within about two hours when placed in formations at temperatures of about 140–150° F. At lower formation temperatures longer curing time is necessary; at higher temperatures a shorter time will suffice. The amount and type of catalyst may be varied to obtain whatever practical curing time is found desirable under specific conditions.

The composition of the cement may be varied within wide limits. Generally, it is preferred to employ alpha gypsum as the cementing agent, although other types of calcined gypsum or gypsum cements may be used. Alpha gypsum-resin blends require very low amounts of water to produce thin slurries, hence, resin solutions expressed from such slurries are highly concentrated with respect to their resin content which is advantageous in effecting the complete sealing of porous formations.

Malamine-formaldehyde resins, or aldehyde condensation products of triazines are preferred, as such resins are compatible with gypsum cements and permit production of thin slurries with low mixing-water requirements.

Catalysts are normally employed to accelerate the hardening or cure of the resin. With melamine resins, such catalysts as ammonium chloride, boric acid, zinc sulfate, aluminum sulfate, weak organic acids, or acid salts are operative. Preferably, the catalysts are selected from that group of available products which will produce a pH of about 5 to 6 in the mixed slurry. For use in formations where temperature is high (above 125–135° F.), the resin may be cured at a higher pH, and even in the absence of a catalyst.

The setting time of the gypsum cement may be adjusted to any desired value by use of well known retarders or set-accelerators. Examples of retarders are soluble citrates, acetates, phosphates, keratin, glue, gelatin, casein, etc. Accelerators include finely ground raw gypsum, $K_2SO_4$, $Al_2(SO_4)_3$, $KHSO_4$, $NaClZnSO_4$, and many other soluble salts. Combinations of accelerators and retarders may be employed to obtain stabilization of setting time against change by such agencies as variation in mixing procedure, temperature or contamination by mixing-water impurities, etc.

The resin content of the compositions is preferably maintained within the limits of say, from 15% to 40%, based on the total weight of the dry mix, although greater or lesser amounts of resin may be employed under special conditions. For example, in highly permeable formations, where deep penetration of the formation is required, a blend containing a higher proportion of resin should be employed. Tight formations will require less resin to effect complete sealing and adequate penetration.

Example II

Instead of using the alpha-gypsum of Patent No. 1,901,051, it is possible to employ the ordinary forms of calcined gypsum, such as plaster of Paris, stucco, etc., in conjunction with the triazine-aldehyde resins. Ordinary calcined gypsum compositions suitable for use in connection with the present invention are more completely described in the copending application of the present inventor and Edward W. Duffy, Serial No. 574,635, filed January 25, 1945. Typical products are mixtures of 75 parts of plaster of Paris (calcium sulfate hemihydrate), 25 parts of a melamine-formaldehyde condensation product that is still in the water-soluble form, and 5 parts of ammonium chloride, which latter develops acidity in the mixture and thereby assists in the eventual curing and hardening of the melamine-formaldehyde resin.

The melamine resin is obtainable on the market under various trade names, such, for example, as "Uformite QJ 99," made by the Resinous Products Co., of Philadelphia, Pa.; and may comprise, for example, the resins described in Talbot Patent No. 2,260,239, and Widmer and Fisch Patent No. 2,310,004. A suitable condensation product may be made by heating about 1 mol of melamine with about 4 mols of formaldehyde, heating to the boiling point, preferably under a reflux condenser, for about 15 minutes, after which enough of the volatile constituents may be distilled over until the reacting mixture reaches a temperature of about 105° C. This will yield a viscous liquid containing the desired resin. This liquid may be used, as by mixing it either with the ordinary plaster of Paris or with the alpha gypsum or other cementitious material, and a sufficient amount of an acid-yielding catalyst to insure the setting up and hardening of the resin in the mixture. Ordinarily, however, it is more convenient to employ a water-gauged mixture of the dry resin and the gypsum cement.

While the triazine-aldehyde resins, and particularly the melamine-formaldehyde resins have been described in the thus far mentioned examples, it has been found that there are other water-soluble curable resins sufficiently compatible with gypsum cements, such as the alpha gypsum, to permit of their use in connection with the present invention. Examples of such other resins are urea-formaldehyde condensation products, dimethylolureas which can be cured by acids into water-insoluble urea-formaldehyde resins, water-soluble phenolic-aldehyde resins capable of being cured at temperatures below 250° F., resorcinol-formaldehyde resins in aqueous solutions, and, in fact, any water-soluble heat-curable resin that is compatible with gypsum may be employed in producing mixtures capable of use in conjunction with the teachings of the present invention.

Example III

For instance, when using urea-formaldehyde resins, a suitable composition may consist of a dry mixture of

| | |
|---|---|
| Urea-formaldehyde resin | 25 parts |
| Alpha gypsum | 75 parts |
| Sodium citrate, as retarder | 0.02 to 0.05 part |
| $NH_4Cl$ | 1.0 part |

Which composition is mixed with about 35 parts of water per 100 parts of the dry composition to form a slurry that is then used as hereinabove indicated.

The use of the present sealing composition permits placing wells in production in the minimum of time. The placing pressure need be maintained for only a few minutes—not over an hour at most—particularly if the setting time of the cement is adjusted to about a 60 minute set, which has been found practical for most applications. The setting of the cement plug effectively seals the resin solution in place in the formation surrounding the plug and prevents it from being forced back into the well by the formation pressure, upon release of the squeezing pressure.

The heat liberated during hydration of the calcined gypsum in the composition is sufficient to markedly raise the temperature of the set material and its surroundings. This increase in temperature is sufficient to accelerate the rate of cure of the resin, and permits successful use of the composition in formations at low temperatures. For example, the mix disclosed in Example I undergoes a temperature rise during set of 84° F., under adiabatic conditions. Heat loss to surroundings prevents attainment of this amount of temperature rise in actual use, but temperature increase is still sufficient to be of distinct aid in curing the resin. The composition of Example I has been found applicable in formations at temperatures as low as 60° F.

The cement composition expands slightly (0.1–0.2 per cent linear expansion) during the set. This action results in the formation of a very tight plug in intimate contact with the resin-saturated formation. After cure, the resin completely fills the pores of the formation and effects a positive bond to the sides and bottom of the cement plug. This sheath of resin-bonded and saturated sand or rock completely protects the cement plug from direct contact with water or brine carried by the formation, thus protecting it from erosion or solution. The set resin remaining in the cement itself also acts to protect the cementitious material therein from such action.

The fast setting action, particularly when using a gypsum-base cement, also permits efficient and positive water shut-off without affecting the oil production. Oftentimes oil- and water-bearing formations are in close contact. It is desirable to shut off water without shutting off oil. By the use of the present invention, short section plugs may be placed in series, one section over the succeeding section, permitting the well to flow between plug section placements in order to check the degree of water shut off. When the water shut-off is achieved, the well is put into steady production. Series placement of plugs is impractical with most cements or other types of sealing compositions, due to the long time interval required between placement of successive sections, but becomes practical when following the teachings of the present invention.

Another feature of the invention involves the use of acids or other catalysts to accelerate the curing of the resins. This may be accomplished by first wetting the formation therewith so as to at least leave a film of the catalyst thereon. As the resin solution comes into contact with the thus treated formation, it will rapidly harden. This may be advantageous when working at relatively low temperatures, where the natural cure of the resin might be somewhat slow, or in the presence of alkaline-reacting formations.

In using the plugging composition of the present invention it is unnecessary to bail or pump out the well prior to placement, as the composition will set and the resin will cure in contact with all normally occurring brines and oils.

The composition may be employed in combination with other types of cements or plug-forming materials. For example, plugs of Portland cement or ordinary gypsum cement may be capped with short plugs of the resin-cement blend to protect the plug and to form a short section of resin-penetrated formation at the desired point.

The product is not to be considered as exclusively confined to sealing off formation-water. Employed in a similar manner it can be used to shut off or reduce gas flow. It may also be used as a grouting material to shut off water in mine ventilating shafts, stope openings, etc. It furnishes an excellent plug cap for confining nitroglycerine during shooting of wells, etc.

While for most purposes a gypsum-base cement is the least expensive, and hence the most desirable, yet the scope of the present invitation is not to be circumscribed by the fact that the examples given have been in connection with such gypsum cements.

What is claimed as new is:

1. Method of sealing permeable earth formations which comprises forcing thereagainst a slurry comprising settable cementitious material and a curable condensation product whereby some of the latter is forced out of admixture with the cementitious material into said formation and causing said condensation product to be cured within the formation, thereby forming a water-resistant sheath around the cementitious material.

2. Method of sealing permeable earth formations which comprises forcing thereagainst a slurry comprising a settable calcium sulfate cement and a curable condensation product whereby some of the latter is forced out of admixture with said cement and into said formation, and causing said condensation product to be cured within the formation, thereby forming a water-resistant sheath around said cement.

3. Method of sealing permeable earth formations which comprises forcing thereagainst a slurry comprising a settable calcium sulfate cement and a curable triazine-aldehyde condensation product whereby some of the latter is forced out of admixture with said cement and into said formation, and causing said condensation product to be cured within the formation, thereby forming a water-resistant sheath around said cement.

4. Method of sealing permeable earth formations which comprises forcing thereagainst a slurry comprising a rapidly settable calcium sulfate cement and a curable melamine-formaldehyde condensation product whereby some of the latter is forced out of admixture with said cement and into said formation, and causing said condensation product to be cured within the formation, thereby forming a water-resistant sheath around said cement.

5. A plug for preventing access of fluids to a hole in a permeable earth formation which comprises a core comprising a set cementitious material containing a cured condensation product, and a sheath of said cured condensation product surrounding said core.

6. A plug for preventing access of fluids to a hole in a permeable earth formation which comprises a core comprising a set calcium sulfate cement containing a cured condensation product, and a sheath of said cured condensation product surrounding said core.

7. A plug for preventing access of fluids to a hole in a permeable earth formation which comprises a core comprising a set calcium sulfate cement containing a cured triazine-aldehyde condensation product, and a sheath of said cured condensation product surrounding said core.

8. A plug for preventing access of fluids to a hole in a permeable earth formation which comprises a core comprising a set calcium sulfate cement containing a cured melamine-formaldehyde condensation product, and a sheath of said cured condensation product surrounding said core.

9. Method of sealing an earth formation surrounding a hole drilled therein which comprises placing within said hole an aqueous slurry comprising a major portion of a rapidly setting inorganic cement and a minor portion of a water-soluble curable condensation product, and applying pressure to the mixture so as to force some of the condensation product out of the mixture so as to form a sheath of condensation product around said mixture, and effecting the curing and insolubilization of said condensation product.

10. Method of sealing an earth formation surrounding a hole drilled therein which comprises placing within said hole an aqueous slurry comprising a major portion of a rapidly setting calcium sulfate hemihydrate cement and a minor portion of a water-soluble curable condensation product, and applying pressure to the mixture so as to force some of the condensation product out of the mixture so as to form a sheath of condensation product around said mixture, and effecting the curing and insolubilization of said condensation product.

11. Method of sealing an earth formation surrounding a hole drilled therein which comprises placing within said hole an aqueous slurry comprising a major portion of a rapidly setting calcium sulfate hemihydrate cement and a minor portion of a water-soluble curable triazine-aldehyde condensation product, and applying pressure to the mixture so as to force some of the condensation product out of the mixture so as to form a sheath of condensation product around said mixture, and effecting the curing and insolubilization of said condensation product.

12. Method of sealing an earth formation surrounding a hole drilled therein which comprises placing within said hole an aqueous slurry comprising a major portion of alpha gypsum cement and a minor portion of a melamine-formaldehyde condensation product, and applying pressure to the mixture so as to force some of the condensation product out of the mixture so as to form a sheath of condensation product around said mixture, and effecting the curing and insolubilization of said condensation product.

13. An earth-sealing plug consisting essentially of a set core of gypsum and a surrounding sheath of a water-resistant organic synthetic resin.

14. An earth-sealing plug consisting essentially of a set core of alpha gypsum and a surrounding sheath of a water-resistant organic synthetic resin.

15. An earth-sealing plug consisting essentially of a set core of alpha gypsum and a surrounding sheath of an insoluble triazine-aldehyde condensation product.

16. An earth-sealing plug consisting essentially of a set core of alpha gypsum and a surrounding sheath of an insoluble melamine-formaldehyde condensation product.

17. An earth-sealing plug positioned in a permeable earth formation and consisting essentially of a coherent mass of interlaced alpha gypsum crystals and an insoluble melamine-aldehyde condensation product.

18. Method of sealing an earth formation which comprises forcing thereinto and thereagainst a composition consisting of unset alpha gypsum, a curable triazine-aldehyde condensation product, and water.

19. Method of sealing an earth formation by means of an aqueous solution of a curable synthetic resin which comprises wetting said formation with a catalyst capable of effecting the curing of said resin, and thereafter forcing said solution against said formation.

20. Method of sealing an earth formation by means of an aqueous solution of a curable synthetic resin which comprises wetting said formation with an acid substance capable of effecting the curing of said resin, and thereafter forcing said solution against said formation.

21. Method of sealing an earth formation which comprises introducing thereinto an aqueous slurry of a settable cement and a water-soluble curable condensation product, said cement in setting yielding sufficient heat to cure said condensation product even in a relatively cold earth formation.

22. Method of sealing an earth formation which comprises introducing thereinto an aqueous slurry of alpha gypsum and a curable melamine-formaldehyde condensation product, said alpha gypsum upon hydration to the calcium sulfate dihydrate stage yielding sufficient heat to cure said condensation product even in a relatively cold earth formation.

23. An earth-sealing plug positioned in a permeable earth formation and consisting essentially of a coherent mass of interlaced calcium sulfate dihydrate and an insoluble melamine-aldehyde condensation product.

24. An earth-sealing plug positioned in a permeable earth formation and consisting essentially of a coherent mass of interlaced calcium sulfate dihydrate crystals and an insoluble melamine-formaldehyde condensation product.

25. Method of sealing an earth formation which comprises introducing thereinto an aqueous slurry of calcium sulfate hemihydrate and a curable melamine-formaldehyde condensation product, said calcium sulfate hemihydrate upon hydration to the calcium sulfate dihydrate stage yielding sufficient heat to cure said condensation product even in a relatively cold earth formation.

MANVEL C. DAILEY.

REFERENCES CITED

The following references are of record in the file of this patent:

UNITED STATES PATENTS

| Number | Name | Date |
|---|---|---|
| 2,191,652 | Hamilton | Feb. 27, 1940 |
| 2,255,998 | Howald | Sept. 16, 1941 |
| 2,274,297 | Irons | Feb. 24, 1942 |
| 2,346,999 | Sandford | Apr. 18, 1944 |

FOREIGN PATENTS

| Number | Country | Date |
|---|---|---|
| 453,703 | Great Britain | 1936 |
| 480,316 | Great Britain | 1938 |
| 480,339 | Great Britain | 1938 |

Certificate of Correction

Patent No. 2,492,212                                                  December 27, 1949

MANVEL C. DAILEY

It is hereby certified that error appears in the printed specification of the above numbered patent requiring correction as follows:

Column 10, line 12, after the word "dihydrate" insert *crystals*;

and that the said Letters Patent should be read with this correction therein that the same may conform to the record of the case in the Patent Office.

Signed and sealed this 6th day of June, A. D. 1950.

[SEAL]

THOMAS F. MURPHY,
*Assistant Commissioner of Patents.*